(No Model.) 2 Sheets—Sheet 1.
V. FALKNER.
CORN HUSKER.
No. 490,429. Patented Jan. 24, 1893.
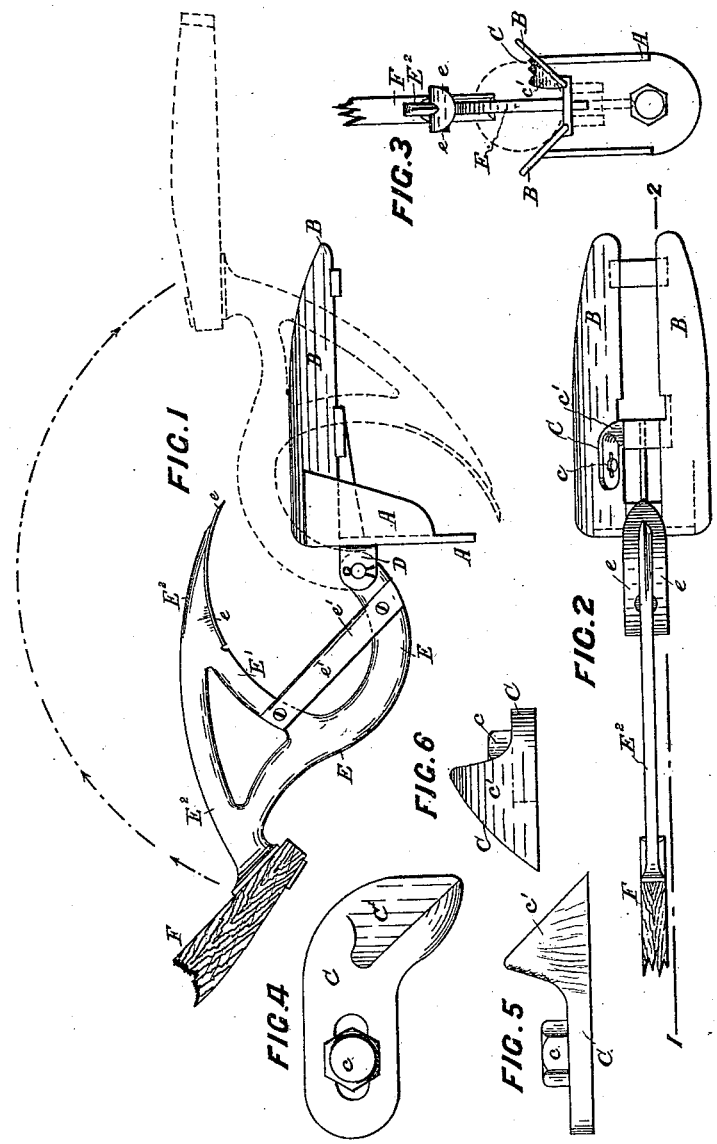
Witnesses:
E. B. Bolton
C. Case.
Inventor:
Victor Falkner
By Richards & R
his Attorneys.

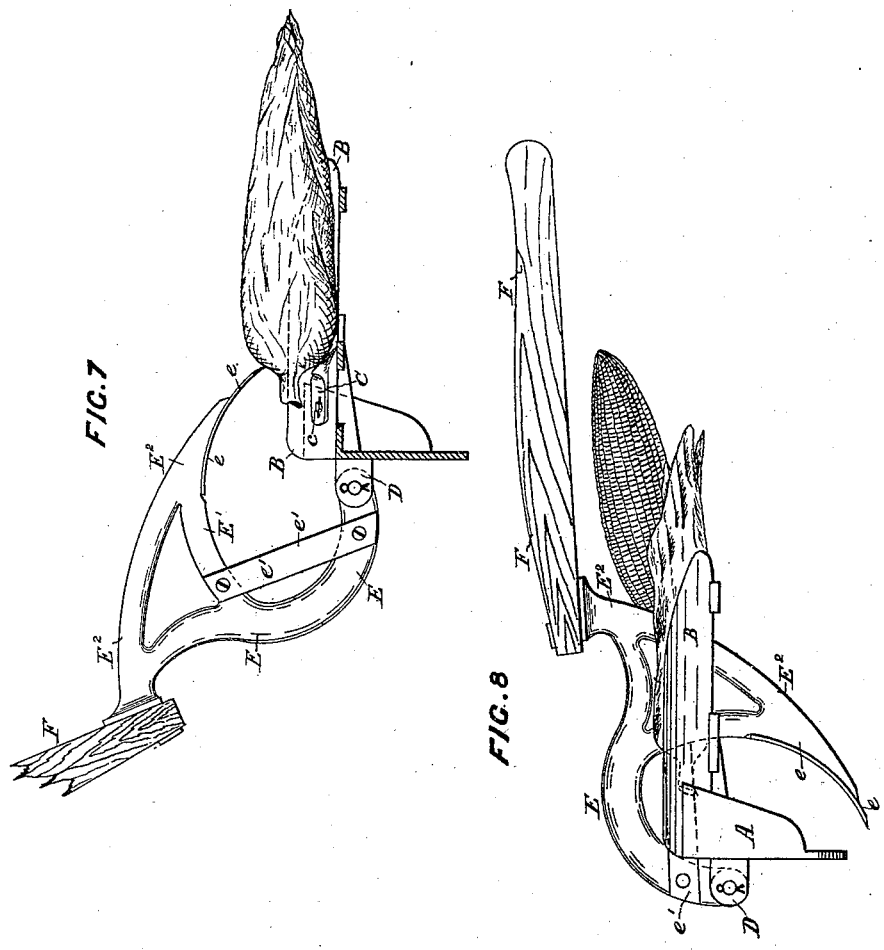

UNITED STATES PATENT OFFICE.

VICTOR FALKNER, OF SYDNEY, NEW SOUTH WALES.

CORN-HUSKER.

SPECIFICATION forming part of Letters Patent No. 490,429, dated January 24, 1893.

Application filed November 10, 1891. Serial No. 411,486. (No model.)

*To all whom it may concern:*

Be it known that I, VICTOR FALKNER, a subject of the Queen of Great Britain and Ireland, and a resident of Sydney, in the Colony of New South Wales, have invented an Improved Corn-Husker, of which the following is a specification.

The object of this invention is to cut the ear of maize or Indian corn from the stem, and separate the ear from the husk, at one operation.

In the accompanying drawings, Figure 1 is a side elevation of my improved corn-husker, showing the lever and the knife in two positions. Fig. 2 is a plan view of the same. Fig. 3 is an end view of the same. Fig. 4 is a plan view of the cob-adjuster removed from the cob-holder. Fig. 5 is a side elevation of the same. Fig. 6 is an end view of the same. Fig. 7, is a section through the ear holder on line 1—2 of Fig. 2, showing parts in elevation. Fig. 8, is a side view of the device with the parts in a different position, from that of Fig. 7.

The apparatus is made so as to be capable of being fixed to a bench or standard of any suitable height and for that purpose is provided with a bracket A. The ear holder B, is made with inclined sides, as may be seen by referring to Fig. 3 and on one or other of the inclined sides is attached the adjustable ear adjuster C, which is capable of an endwise adjustment, and may be secured in the desired position, by the set screw $c$. At the rear of the ear-holder is a lug D, to which the lever E is pivoted. The lever E, is preferably made in a bent form, as may be seen by referring to Fig. 1, and is provided with a handle F, by which it is manipulated, with a knife carrier E', and with curved forwardly extending wedge like arm $E^2$. A curved blade or knife $e$ is attached to the knife carrier by screws or in any other suitable manner. The knife $e$ should be bent into an arc, of which the fulcrum of the lever E, is the center. The ear-adjuster consists of a shank to receive the set screw $c$, by which it is adjustably attached, and an inclined plane $c'$. The inclined plane $c'$, on the ear-adjuster C, when once adjusted, renders the ear-holder B, suitable to receive all sized ears, as a large ear would lie in the ear-holder, farther up the incline $c'$, and a small ear, lower down and farther forward: this arrangement will insure that the knife $e$ shall enter each stem and sever it from the ear, at the point where the cob is united to the stem. The curved bracket E, is provided with an auxiliary knife $e'$, which is secured to the knife carrier E', and the bracket E, near its fulcrum as shown in Fig. 1. This knife $e'$, is for the purpose of splitting the base of the husk, at the finish of the stroke of the lever E, so that the husk may be readily removed from the knife $e$, when the lever is withdrawn.

In Fig. 7 the ear is shown in position in the ear-holder, its base abutting against the incline $c'$, on the ear-adjuster C. The knife $e$, is shown in the position it would occupy, at the moment of entering the base of the husk. Upon the knife being driven down to the position shown in Fig. 8, the base of the ear, and the stem will be retained behind the knife, thus holding the husk while the inclined plane $E^2$, forces the ear before it, and out of the husk, when it will be cleared from the ear-holder and free to fall to the ground. At the last part of the stroke, the auxiliary knife $e'$, will split the base of the husk and will thus free the husk from the knife $e$ and the curved wedge like arm $E^2$, and, when the lever is thrown back, the husk will either drop off from the lever, or may be removed by hand without exertion.

Having now particularly described and ascertained the nature of my said invention and the manner in which the same is to be performed, I declare that what I claim is:—

1. In combination the ear holder consisting of the two sides B, B, the bracket E pivoted to the rear end of the said holder adjacent to the rest for the stem portion of the ear, the said bracket having an arm $E^2$ curved forwardly, the knife secured to the end of the said arm on the edge nearest the pivot or the rear of the holder, the said arm being of wedge like form along the forward edge opposite the knife whereby the said edge will push the ear forwardly as it is severed from the stem, substantially as described.

2. In combination the ear holder the bracket E pivotally supported and having a curved forwardly extending wedge like arm $E^2$ and a knife $e$, and a second knife $e'$, carried by the pivoted bracket in rear of the first knife, substantially as described.

3. In combination the ear holder comprising the sides B. B. the pivoted bracket carrying knives and having a wedge like forward extension, and the inclined ear adjuster carried by the holder, substantially as described.

4. In combination the ear holder, the pivoted bracket having a forwardly extending arm carrying a knife to operate transversely of the stem of the ear placed in the holder, and a second knife in rear of the first arranged to operate against the side of the stem and longitudinally thereof to split the same to the end, substantially as described.

Dated this 2d day of October, 1891, at Sydney.

VICTOR FALKNER.

Witnesses:
MANFIELD NEWTON, C. E.,
J. S. WHITELOCKE.